(12) United States Patent
Mizuno et al.

(10) Patent No.: US 7,128,255 B2
(45) Date of Patent: Oct. 31, 2006

(54) MAGNETIC HEAD, AND DEVICE AND METHOD FOR MANUFACTURING THE SAME

(75) Inventors: Toru Mizuno, Chuo-ku (JP); Kouji Tanaka, Chuo-ku (JP); Satoshi Yamaguchi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 162 days.

(21) Appl. No.: 10/445,027

(22) Filed: May 27, 2003

(65) Prior Publication Data

US 2003/0193741 A1    Oct. 16, 2003

Related U.S. Application Data

(62) Division of application No. 09/767,228, filed on Jan. 23, 2001, now Pat. No. 6,600,630.

(30) Foreign Application Priority Data

Jan. 24, 2000   (JP)   .............................. 2000-013800

(51) Int. Cl.
*B23K 1/06*    (2006.01)

(52) U.S. Cl. ................. 228/110.1; 360/234.5; 29/603.04; 29/603.06

(58) Field of Classification Search ............. 228/110.1, 228/2.1; 156/580.1, 73.2
See application file for complete search history.

(56) References Cited

U.S. PATENT DOCUMENTS

| 5,959,808 | A | 9/1999 | Fan et al. |
| 6,021,022 | A | 2/2000 | Himes et al. |
| 6,046,887 | A | 4/2000 | Uozumi et al. |
| 6,078,473 | A | 6/2000 | Crane et al. |
| 6,125,015 | A | 9/2000 | Carlson et al. |
| 6,147,840 | A | 11/2000 | Khan |

FOREIGN PATENT DOCUMENTS

| JP | 9-283568 | * | 10/1997 |
| JP | 11-238216 | * | 2/1998 |
| JP | 2001-60310 | * | 8/1999 |

* cited by examiner

*Primary Examiner*—Jonathan Johnson
(74) *Attorney, Agent, or Firm*—Oblon, Spivak, McClelland, Maier & Neustadt, P.C.

(57) ABSTRACT

The present invention provides a magnetic head construction, a connection method and a connecting device by which excellent electrical connection can be carried out between a core electrode and a substrate land face on a flexure in a magnetic head employing the piggy back system. In order to attain the object of interest, in the present invention, a fine adjustment actuator is arranged between a core and a flexure; a projection portion which is projected from the fine adjustment actuator when viewed from the flexure is provided in the core; a hole is provided in the position, on the flexure, corresponding to the projection portion; only the core is fixed by a support portion provided through the hole portion and a clamp pin without applying any load to the fine adjustment actuator; and while maintaining this fixing state, an electrode and a substrate land are bonded to each other with a wire.

6 Claims, 3 Drawing Sheets

MAGNETIC HEAD, AND DEVICE AND METHOD FOR MANUFACTURING THE SAME

BACKGROUND OF THE INVENTION

1. Field of the Invention

The present invention relates in general to a magnetic head for use in a hard disc drive (hereinafter, referred to as an HDD). More particularly, the invention relates to the construction of a magnetic head for use in the HDD for which the high recording density has been obtained, a bonding device which is suitably employed in the process of manufacturing the magnetic head, and a bonding method.

2. Related Background Art

In recent years, the recording density of HDDs has been rapidly increased, and the width of each of the tracks as the recording areas in the hard disc as the recording medium has become remarkably narrow combined with the miniaturization of the HDDs. For this reason, with the tracking of the magnetic head by only a voice coil motor which has been conventionally carried out, it becomes difficult to position accurately the magnetic head in this narrow track Thus, there has been proposed the control of the tracking based on the piggy back system.

The conventional magnetic head comprises a core actually writing and reading the recorded information to and from the hard disc, and a suspension for supporting the core. On the other hand, the piggy back system is characterized in construction by providing a fine adjustment actuator between the core and the suspension (hereinafter, referred to as a gimbal). That is, the system of interest is such that the position of the magnetic head is moved to the neighborhood of the desired position of the tracking by the voice coil motor and then, the position of the core is corrected by the fine adjustment actuator, whereby the tracking of the high accuracy is carried out.

As for the construction of the magnetic head for use in the piggy back system, for example, there is one shown in FIG. 4 and FIG. 5. A magnetic head 1 includes a core 10, a gimbal 2 which extends in one direction to support the core 10 at one end thereof, and a fine adjustment actuator 30 which is arranged between the core 10 and the gimbal 2. The gimbal 2 is composed of a flexure 4 formed of an insulating flexible resin thin plate on which a conductor pattern for wiring is formed, a load beam 3 which is formed of a elastic metallic thin plate or the like to which the flexure 4 is adhered, and a base plate 7 which is firmly fixed to the base portion of the load beam 3 as the other end of the gimbal 2.

The head portion of the flexure 4 has an actuator attaching portion 5 which is not adhered to the head portion of the load beam 3, but is arranged so as to lie on the load beam 3 roughly in parallel therewith. The fine adjustment actuator 30 is firmly fixed to the actuator attaching portion 5, and the core 10 is fixed to the fine adjustment actuator 30 so as to be able to pivot in the extension direction of the gimbal 2.

A dimple (a projection portion for abutting from the back face the flexure 4) 6 which is formed integrally with the head portion of the load beam comes in contact with the back face of the actuator attaching portion 5, i.e., the back face of the flexure 4 (refer to FIG. 1). Normally, the fixing of the core 10 and the fine adjustment actuator 30 to the flexure 4 is carried out such that the pivotal center of the core 10 is aligned with the center of the dimple 6.

An element (not shown) including an electromagnetic conversion element and a magnetoelelctric conversion element, and electrodes 11 which are used to draw the electrical signal from that element to the outside are formed on one end face of the core 10. The electrodes 11 are electrically connected to end portions 8 of the electrical wiring provided in the flexure 4 (hereinafter, referred to as a substrate land) through wires 66 each made of Au or the like. In this connection, the flat surface in which the substrate lands 8 are formed and the flat surface on the core 10 in which the electrodes 11 are formed make an angle of about 90 degrees.

As for the method of connecting electrically the electrodes formed on the two flat surfaces making an angle of about 90 degrees as described above, there have been proposed the various methods such as the wire bonding method disclosed in Japanese Patent Application No. 10-56046 and No. 11-235785 by the present applicant, and the ball bonding method employing conductor balls disclosed in Japanese Patent Application Laid-open No. 9-283568 by the present applicant.

As described above, in the construction as well of the magnetic head employing the piggy back system, the electrodes 11 and the substrate lands 8 need to be electrically connected to each other through the wires 66. However, the fine adjustment actuator 30 is present between the core 10 and the flexure 4, and also the fixed distance is defined between the electrodes 11 and the substrate lands 8. Therefore, the ball bonding method disclosed in Japanese Patent Application Laid-open No. 9-283568 is difficult to be applied thereto.

In addition, in the above-mentioned wire bonding method, when bonding the wires 66 to the electrodes 11 and the substrate lands 8, the core 10 and the flexure 4 are clamped by a clamp mechanism to carry out the fixing therefor. However, the fine adjustment actuator 30 is in general weak against the force applied from the outside and hence is readily damaged. Since in the clamp mechanism in the conventional wire bonding method, the fine adjustment actuator 30 is loaded with the force for clamping, the method of interest can not be directly applied to the magnetic head employing the piggy back system.

In addition, while in the magnetic head employing the piggy back system, the core 10 is pivoted by the fine adjustment actuator 30, when each of the wires 66 is short, there may occur the case where the pivotal movement is limited by these wires 66. Therefore, in order to carry out smoothly and accurately that pivotal movement, each of the wires 66 needs to have the flexibility and the sufficient length. Further, against the bending which is applied to the wires 66 by the pivotal movement operation, each of the wires 66 needs also to have the sufficient durability.

SUMMARY OF THE INVENTION

In the light of the foregoing, the present invention has been made in order to solve the above-mentioned problems associated with the prior art, and it is therefore an object of the present invention to provide a method and device for, without carrying out the clamp for a fine adjustment actuator, connecting electrically electrodes and substrate lands to each other while maintaining the flexibility, and a magnetic head having the construction which can cope with the method and device.

In order to attain the above-mentioned object, according to the present invention, there is provided a magnetic head having a flexure having an electrical wiring formed therein, a fine adjustment actuator fixed to the flexure, and a core which is fixed to the fine adjustment actuator and also is electrically connected to the electrical wiring to be driven for the flexure by the fine adjustment actuator, characterized in that the core has a projection portion which is projected outwardly from the fine adjustment actuator when viewed from the flexure to face the flexure, and a hole which is penetrated to the rear face in the position roughly facing the projection portion is formed in the flexure.

In addition, in the above-mentioned magnetic head, it is preferable that the projection portion is projected in the direction in which the end portion of the electrical wiring is formed on the flexure, and that the through hole is formed between the end portion of the electrode wiring and the end portion of the lower face of the fine adjustment actuator. Also, it is preferable that the wire through which the core and the end portion of the electrical wiring are electrically connected to each other has the flexibility as well as the flexure.

In addition, in order to attain the above-mentioned object, according to the present invention, there is provided a device for manufacturing a magnetic head, for use in a magnetic head having a flexure having an electrical wiring formed therein, a fine adjustment actuator fixed to the flexure, and a core which is fixed to the fine adjustment actuator and is driven for the flexure by the fine adjustment actuator, a device for wire-bonding an electrode formed in the core and the end portion of the electrical wiring to each other, the device including a work fixing block including a first support surface to which the rear face of the formation part of the end portion of the electrical wiring in the flexure, and the vicinity thereof are both fixed and a second support surface for supporting the core, and a work clamp pin for clamping together with the second support surface the core to fix it.

In addition, in the above-mentioned device, it is preferable that the core has a projection portion which is projected outwardly from the fine adjustment actuator when viewed from the flexure to face the flexure, and that a hole which is penetrated through the flexure to the rear face in the position roughly facing the projection portion is formed in the flexure, and the second support surface is provided through the hole portion to support the core.

Further, in the above-mentioned device, it is preferable that the wire bonding is carried out with the core and flexure held by the work fixing block and the work clamp pin, and also is carried out such that after completion of the bonding to one of the core and the end portion of the electrical wiring, the core and the flexure are pivoted by about 90 degrees while being fixed to carry out the bonding to the other. Furthermore, the wire through which the core and the end portion of the electrical wiring are electrically connected to each other is preferably connected in the state of being bent, and the bonding of the wire to the core and the end portion of the electrical wiring is preferably carried out by using the ultrasonic wave.

In addition, according to the present invention, as a device for manufacturing electronic components having the same object, there is provided a device for wire-bonding the end portion of the electrical wiring and the electronic component to each other, for use in an electronic device including a substrate having an electrical wiring, a driving device which is fixed to the substrate in the position different from that of the formation of the electrical wiring on the substrate, and an electronic component which is fixed to the driving device to be driven by the driving device, the device including a work fixing block having a first support surface to which the rear face of the formation part of the electrical wiring in the substrate, and the vicinity thereof are both fixed and a second support surface for supporting only the electronic component, and a work clamp pin for clamping together with the second support surface the electronic component to fix it.

Furthermore, as the above-mentioned device, it is preferable that the electronic component has a projection portion which is projected outwardly from the driving device when viewed from the substrate to face the substrate, and a hole which is penetrated through the substrate to the rear face in the position roughly facing the projection portion is formed in the substrate, and that the second support surface is provided through the hole portion to support the electronic component.

In addition, in order to attain the above-mentioned object, according to the present invention, there is provided a method of wire-bonding an electrode formed in the core and the end portion of the electrical wiring to each other, for use in a magnetic head having a flexure having an electrical wiring formed therein, a fine adjustment actuator fixed to the flexure, and a core fixed to the fine adjustment actuator to be driven for the flexure by the fine adjustment actuator, the method including the steps of: fixing the rear face of the formation part of the end portion of the electrical wiring in the flexure and the vicinity thereof by the first support surface; clamping the core by the second support surface and the work clamp pin to fix the flexure, the fine adjustment actuator and the core integrally with one another; bonding the wire end portion to one of the electrode formed in the core and the end portion of the electrical wiring on the flexure; and rotating the flexure, the fine adjustment actuator and the core integrally with one another by about 90 degrees to bond the wire to the other of the electrode formed in the core and the end portion of the electrical wiring on the flexure.

Further, as the above-mentioned method, it is preferable that the core has a projection portion which is projected outwardly from the fine adjustment actuator when viewed from the flexure to face the flexure, and a hole which is penetrated through the flexure to the rear face in the position roughly facing the projection portion is formed in the flexure, and that the second support surface is provided through the hole portion to support the core. In addition, the wire through which the core and the end portion of the electrical wiring are electrically connected to each other is preferably connected in the state of being bent, and the bonding of the wire to the core and the end portion of the electrical wiring is preferably carried out by using the ultrasonic wave.

DESCRIPTION OF THE PREFERRED EMBODIMENTS

Figure 1:
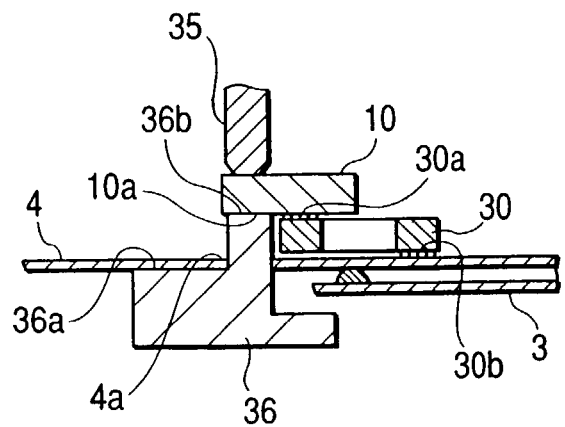
FIG. 1 is a schematic cross sectional view showing the relation between a fixing mechanism according to the present invention and a magnetic head, according to the present invention, which is fixed to by the fixing mechanism.

The construction of a magnetic head, and a bonding method and device according to the present invention will hereinafter be described with reference to the accompanying drawings. FIG. 1 is a schematic cross sectional view of a fixing portion of a magnetic head useful in explaining the magnetic head and a mechanism for fixing the magnetic head used when carrying out the bonding to the magnetic head, according to the present invention, and the arrangement thereof.

As can be seen from the figure, a core 10 is not arranged right above a fine adjustment actuator 30, but is arranged so as to be shifted in the direction of the head of a magnetic head 1 (in the left direction of the drawing in FIG. 1) to form a projection portion 10a which is projected from the position above the fine adjustment actuator 30. The core 10, in the arrangement of interest, is adhered to the fine adjustment actuator 30 at an adhesion portion 30a to be fixed thereto.

Note that the fine adjustment actuator 30 is adhered and fixed to a flexure 4 in an adhesion portion 30b. The arrangement of the core 10 defines a portion of the flexure 4 facing the core 10. A hole 4a is formed through that portion of the flexure 4 facing the projection portion 10a.

A fixing mechanism comprises a work clamp pin 35 and a work fixing block 36. The work fixing block 36 comprises a first support portion 36a to which the head portion of the flexure 4 is fixed by the vacuum adsorption or the like, and a second support portion 36b which is projected from the first support portion 36a to be penetrated through the hole 4a of the flexure 4 in order to support the core 10. Each of the first and second support portions is defined by a roughly flat surface, and the projection portion 10a of the core 10 is clamped by the second support portion 36b and the work clamp pin 35 to be fixed thereby.

Note that, in order to avoid that the load is applied to the fine adjustment actuator 30 during the clamping, the construction is adopted such that the work fixing block 36 does not come in contact with the rear face of the part contacting the fine adjustment actuator 30 of the flexure 4. In addition, the projection height from the roughly flat surface of the first support portion 36a to the roughly flat surface of the second support portion 36b is set such that the load is not applied to the fine adjustment actuator 30 at all when fixing the magnetic head by the fixing mechanism.

While in the above-mentioned embodiment, the projection portion 10a of the core 10 is projected in the head direction of the flexure 4 in the position right above the fine adjustment actuator 30, it is to be understood that the present invention is not limited thereto, but the projection portion 10a may be projected in one or both of the cross direction of the flexure 4. In addition, while each of the shape of the core 10 and the shape of the projection portion 10a has been described as the rectangular parallelopiped, these shapes are not limited to the rectangular parallelopiped. For example, the construction may be adopted such that leaving the portion having the shape of the above-mentioned rectangular parallelopiped, one or a plurality of protrusion-like projection portions for the clamping are provided so as to be projected in the various directions such as the above-mentioned head direction or the cross direction.

In addition, while in the above-mentioned embodiment, the hole 4a which is formed in the flexure 4 has the rectangular shape of which size is roughly the same as that of the projection portion 10a, and only one hole 4a is formed in the position facing the projection portion 10a, the shape of the hole 4a and the number of hole(s) 4a are not limited thereto. For example, two holes may, for the projection portion 10a of this embodiment, be provided in the positions which are located on the flexure 4 and which face both the ends of the projection portion 10a so as to be able to support only both the end portions of the projection portion 10a. Also, it is preferable that in accordance with the change of the projection portion as described above, the arrangement thereof is changed.

Further, with respect to the fixing mechanism, it is preferable that the arrangement of the second support portion 36b of the work fixing block 36 is changed in accordance with the change of the above-mentioned hole 4a, and that the work clamp pin 35 is arranged in the position facing the second support portion 36b with the projection portion 10a so as to clamp the corresponding portion by the work clamp pin 35 and the second support portion 36b. In addition, while in the first support portion 36a, the flexure 4 is adsorbed and fixed by the vacuum adsorption, other fixing method such as the simple clamp, electrostatic adsorption or the combination thereof may be applied thereto.

Note that, with respect to the above-mentioned embodiment and the modification example thereof, as mentioned above as the prior art as well, the fine adjustment actuator 30 is described as the actuator which is pivoted. However, it is more preferable that when reading out the magnetic information which was recorded with high density, the fine adjustment actuator drives the core in the direction perpendicular to the tracks. The present invention can also be applied to this case.

The fixing mechanism having the above-mentioned construction is employed and also the magnetic head is employed which has the above-mentioned construction corresponding to the fixing mechanism, whereby the bonding process can be carried out with the core and the flexure fixed without applying any load to the fine adjustment actuator. Next, the description will hereinbelow be given with respect to the bonding process which is carried out for the magnetic head fixed to the above-mentioned fixing mechanism.

As the method of connecting electrically an electrode 11 and a substrate land 8 to each other according to the present invention, the wire bonding method is employed here. The process of the wire bonding for the electrode 11 and the substrate land 8 is shown in FIG. 2A to FIG. 2D. Note that, when carrying out this bonding process, the core 10, the fine adjustment actuator 30 and the flexure 4 are previously bonded and fixed by the above-mentioned fixing mechanism, respectively.

Figure 2A:
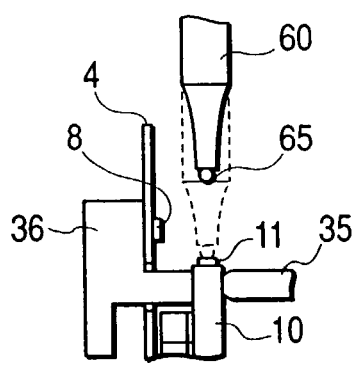
FIG. 2A is a view showing the formation procedure of the electrical connection between an electrode and a substrate land by the wire bonding method according to the present invention.

In the bonding process, it is assumed that first of all, the bonding of a wire 66 is carried out for the electrode 11. As shown in FIG. 2A, a capillary 60 holds therein the wire 66 and also holds at the tip portion thereof a conductor ball 65 formed at the end portion of the wire 66. Then, the capillary 60 in this state is made come close the electrode 11 in the direction perpendicular to the formation surface of the electrode 11. In addition, the conductor ball 65 is pressed down against the electrode 11 in this direction, and at the same time, the vibration in the ultrasonic wave range is applied to the capillary, thereby carrying out the bonding between the conductor ball 65 and the electrode 11.

Figure 2B:
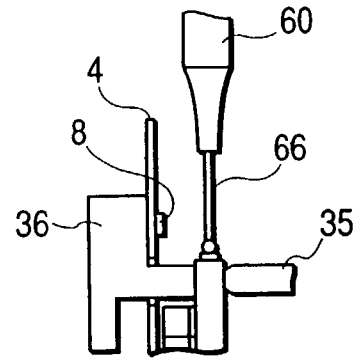
FIG. 2B is a view showing the formation procedure of the electrical connection between an electrode and a substrate land by the wire bonding method according to the present invention.

After completion of the bonding between the conductor ball 65 and the electrode 11, as shown in FIG. 2B, the capillary 60 is moved back from the electrode 11 to be kept away therefrom. In this state, the wire 66 is not fixed to the capillary 60. For this reason, the wire 66 which has been drawn from the capillary 60 to the outside extends from the conductor ball 65 which has been bonded to the electrode 11.

Figure 2C:
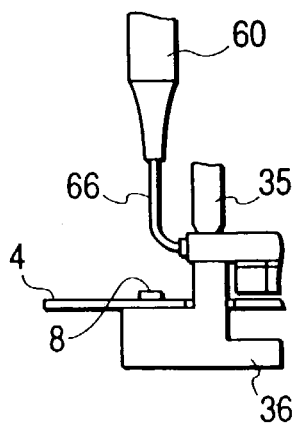
FIG. 2C is a view showing the formation procedure of the electrical connection between an electrode and a substrate land by the wire bonding method according to the present invention.

Next, as shown in FIG. 2C, the fixing mechanism, the core 10 and the like are rotated by about 90 degrees with respect to the approach and moving back direction of the capillary 60 while maintaining the fixing of the core 10 and the like by the fixing mechanism so that the substrate land 8 is arranged roughly perpendicular to the capillary 60. Therefore, the capillary 60 is made come close to the substrate land 8 while taking in the wire 66 which has been drawn to the outside. The manipulation of taking in the wire 66 is completed at a time point when the distance from the conductor ball 65 to the tip portion of the capillary 60, that is, the length of the wire 66 which is kept drawn to the outside has become a predetermined value.

Figure 2D:
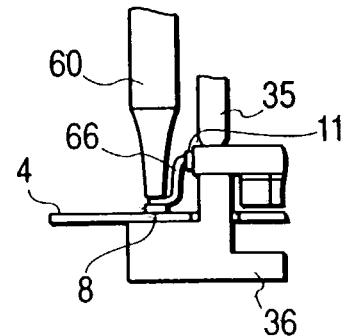
FIG. 2D is a view showing the formation procedure of the electrical connection between an electrode and a substrate land by the wire bonding method according to the present invention.

As shown in FIG. 2D, while holding the wire 66 in this state, the tip portion of the capillary 60 makes the wire 66 contact the substrate land 8 to press down the wire thereagainst. At the same time, by applying the vibration in the ultrasonic wave range to the capillary, the bonding between the wire 66 and the substrate land 8 is carried out. After completion of the bonding between the wire 66 and the substrate land 8, the wire 66 is cut at the tip portion of the capillary 60.

By carrying out the above-mentioned bonding process, the electrode 11 and the substrate land 8 are electrically connected to each other through the wire 66 having the flexibility. In addition, the length of the wire 66 through which the electrode 11 and the substrate land 8 are connected to each other can be set to a suitable value, which results in that the wire 66 does not limit the pivotal movement of the core 10 by the fine adjustment actuator 30 and also the smooth and accurate pivotal movement becomes possible.

While in this embodiment, it is assumed that first of all, the bonding for the electrode 11 is firstly carried out, the bonding for the substrate land 8 may also be firstly carried out. In addition, while in this embodiment, the angle of pressing the conductor ball 65 against the formation surface of the electrode 11 by the capillary 60 in the bonding process, or the angle of pressing the wire 66 against the formation surface of the substrate land 8 is set to about 90 degrees, the present invention is not limited thereto. That is, the direction of pressing the conductor ball 65 or the wire 66 against the electrode 11 or the substrate land 8 by the capillary 60 may be inclined from 90 degrees by an arbitrary angle.

In addition, the heating mechanism is provided in at least one of the work clamp pin 35 and the work fixing black 36, and in the vicinity of the tip portion of the capillary 60, and the bonding is carried out by using jointly the ultrasonic wave and the heat, the thermal compression bonding or jointly the ultrasonic wave and the thermal compression bonding, whereby the above-mentioned arbitrary angle can be further increased. Also, when the above-mentioned pressing direction is 90 degrees, any of these bonding methods is employed, whereby it is possible to realize the shortening of the time required to carry out the bonding, the reduction of the vibration applied to the fine adjustment actuator 30, or the like.

Figure 3A:
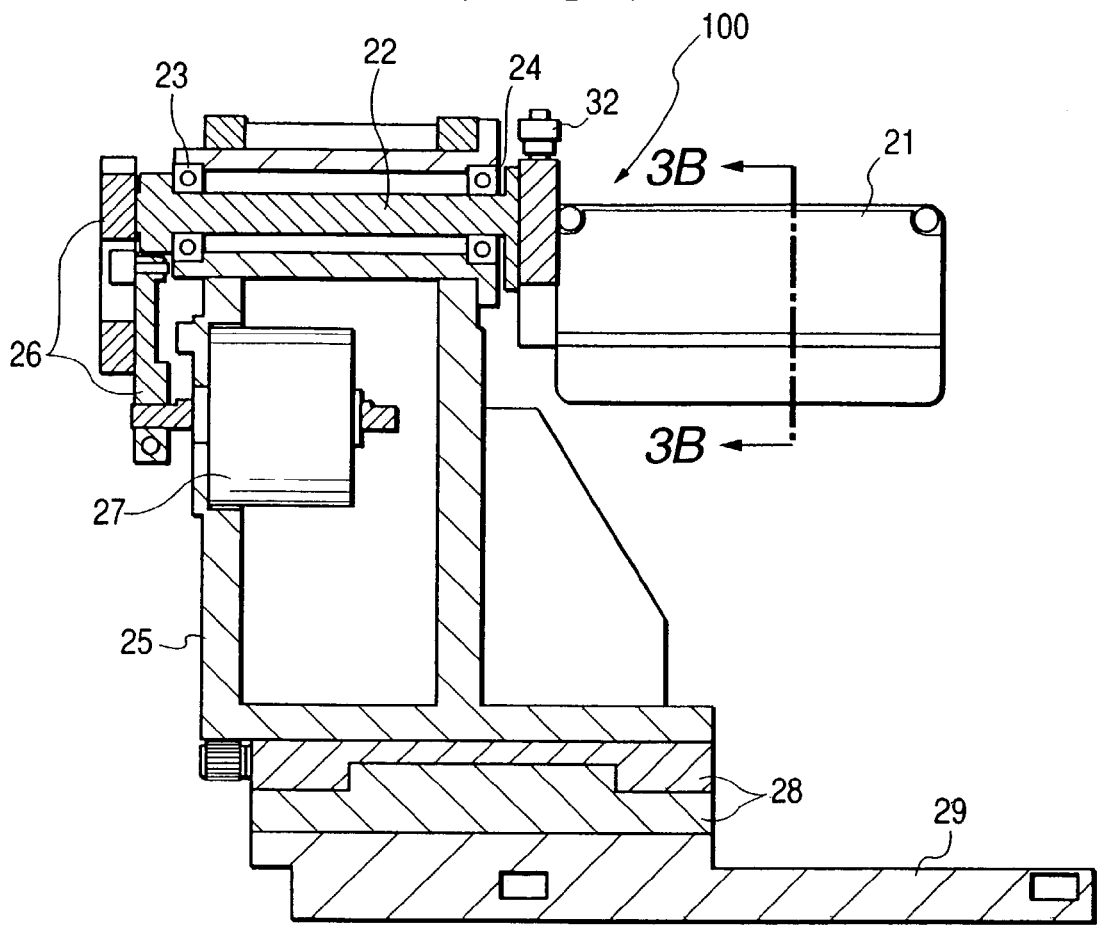
FIG. 3A is a view showing the schematic construction of a device for connecting an electrical wiring according to the present invention.

Next, the description will hereinbelow be given with respect to a bonding device for implementing actually the above-mentioned method. FIG. 3A shows a schematic cross sectional view of a device 100 for connecting an electrical wiring, which is used in a magnetic head for HDDs according to an embodiment of the present invention. In FIG. 3A, a magnetic head 1 for which the bonding is required is fixed onto a work set stage 21 by a work fixing block (not shown), a work clamp pin 35 and a vacuum adsorption mechanism. Note that, the vacuum adsorption mechanism is formed inside the work set stage and is not illustrated in this figure.

The work set stage 21 is connected to one end of a shaft 22 and is rotated integrally with the shaft 22. One end of the shaft 22 is rotatably supported in a support portion 25 through bearings 23 and 24, and the other end thereof is connected to an air cylinder 27 which is fixed to the support portion 25 through a rotational motion transmitting portion 26 so that the shaft 22 is rotated by the air cylinder 27.

Note that, the range of the rotation of the work set stage 21 is regulated by a first and second positioning mechanisms 31 and 32. The support portion 25 is fixed to an XY stage 28 such that the fine adjustment of the position thereof can be two-dimensionally carried out. The lower face of the XY stage 28 is fixed to a base 29.

The first and second positioning mechanisms 31 and 32 have a regulation portion for regulating mechanically the rotation of the work set stage 21, a photo sensor portion for detecting the rotational position, and a conversion portion for converting an output signal from the photo sensor portion into the signal which is to be sent to a control portion of the electrical wiring connecting device. The device 100 is constructed so as to confirm on the basis of the output signal from the sensor that the magnetic head 1 is located at a predetermined position to carry out the bonding work.

In this embodiment, the regulation portion has a screw structure portion, and adjusts the rotational angle by turning the screw of the screw structure portion. When the finer adjustment is required, a micrometer may be employed for the regulation portion. Alternatively, a stepping motor or the like which drives the micrometer in conjunction with the sensor portion may be added so that the rotational angle is changed in accordance with the work.

Figure 3B:
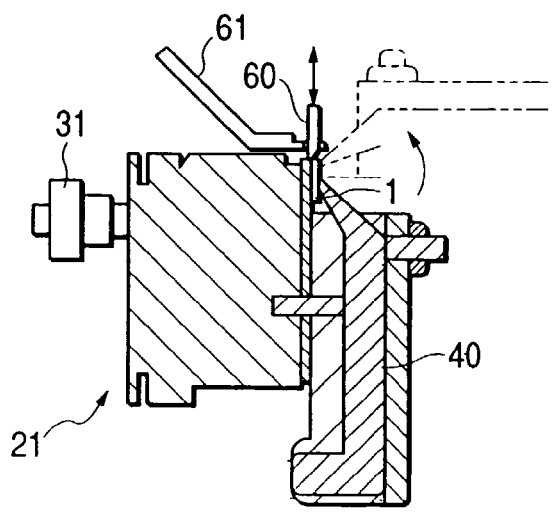
FIG. 3B is a cross sectional view taken on line 3B—3B of FIG. 3A.
Figure 4:
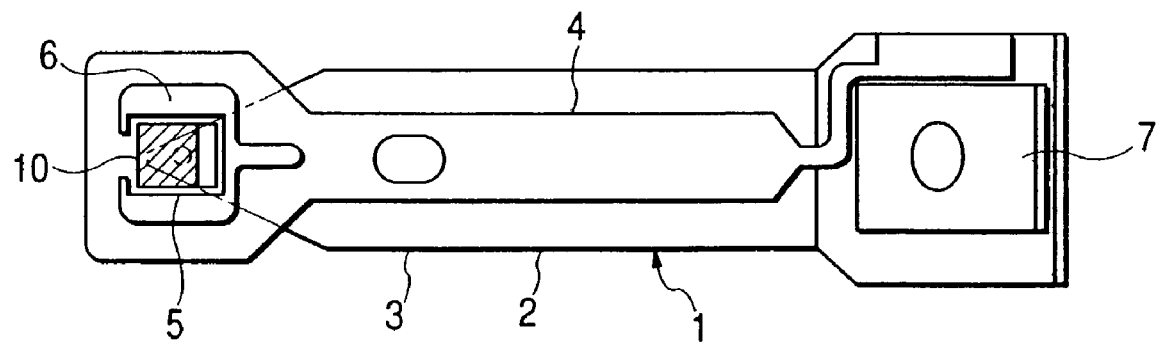
FIG. 4 is a view showing the schematic construction of a magnetic head adopting the piggy back system.
Figure 5:
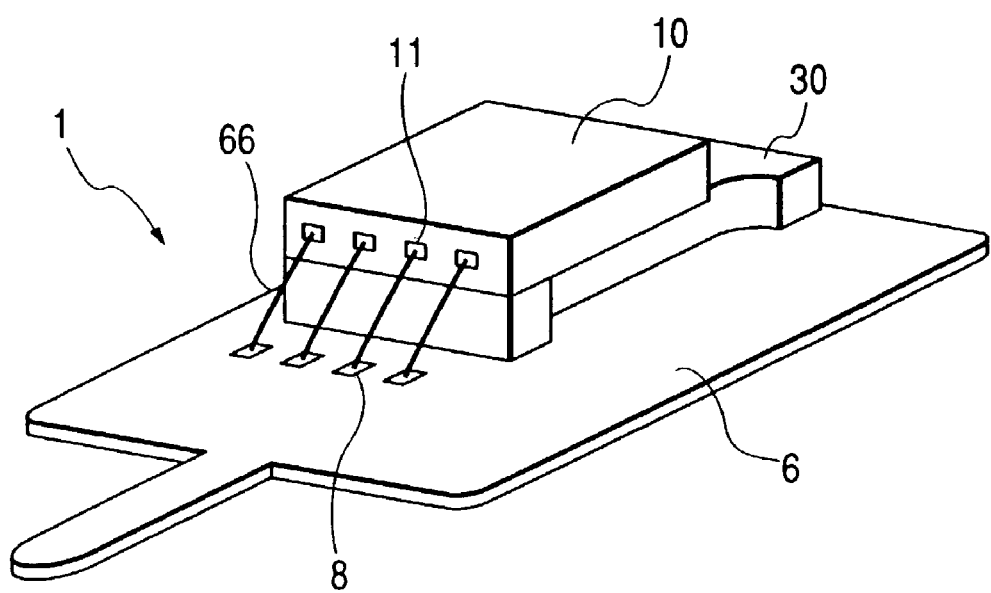
FIG. 5 is a view showing the schematic construction of a magnetic head adopting the piggy back system.

FIG. 3B shows a cross section which is obtained by cutting the work set stage 21 in FIG. 3A along the line 3B—3B, and also the schematic construction of the capillary 60 arranged in a predetermined position with respect to the work set stage 21 and the first positioning mechanism 31 when viewed from that cross section. The work set stage 21 holds the magnetic head 1 by the work fixing block 36. arranged on the surface thereof and the adsorption portion of the vacuum adsorption mechanism and the magnetic head 1 also is fixed by the work clamp pin 35 in order to prevent the position shift of the core 10.

In the bonding, first of all, the magnetic head.1 is fixed in the arrangement indicated by a solid line in FIG. 3B, and then the conductor ball 65 is formed from the metallic wire 66 projected from the tip portion of the capillary 60 by a torch 61. Subsequently, the capillary 60 descends with respect to the electrode surface on the core 10 of the magnetic head 1 to carry out the first bonding. Note that the setting of a predetermined angle is carried out by regulating the rotation of the work set stage 21 to the predetermined angle by the first positioning mechanism 31.

Since the subsequent bonding process is as described above, the description thereof is omitted here for the sake of simplicity. Note that, after completion of the first bonding, the work set stage 21 is rotated to the position, indicated by a dotted line in FIG. 3B, where the second bonding is then carried out. Note that, in the case where a predetermined angle is set in the second bonding as well, the inclination of the work set stage 21 is detected by the second positioning mechanism 32 to regulate the rotation thereof.

By employing the bonding device having the above-mentioned construction, the wire bonding between the electrode 11 and the substrate land 8 can be carried out without applying any force to the fine adjustment actuator 30. In addition, the length of the wire 66 after completion of the bonding can be adjusted to a suitable value, which makes possible the smooth pivotal movement of the large degree of freedom of the fine adjustment actuator 30.

Note that, while in the bonding device, Au is employed as the material of the conductor ball 65 and the wire 66, it is to be understood that the present invention is not limited thereto, and hence any of the various conductor materials may be employed therefor. In addition, while in the device shown in the associated figures, the capillary 60 is illustrated only in the form of the simple substrate, as may be necessary, a plurality of devices may be installed in parallel with one another to improve the work efficiency.

While in the above-mentioned embodiment, the description has been given on the magnetic head employing the piggy back system, it is to be understood that the construction having the above-mentioned projection portion and hole corresponding to the projection portion, the fixing method for the magnetic head having the construction of interest, and the like are not limited to the magnetic head. That is, the above-mentioned construction, and the fixing method and the like may be applied to the various kinds of electronic components employing the piggy back system.

The magnetic head applies the construction inherent in the present invention, and also the device and method for manufacturing the magnetic head according to the present invention are employed, whereby the electrode formed of the wire having the flexibility and the substrate land can be electrically connected to each other without carrying out the clamp for the fine adjustment actuator.

What is claimed is:

1. A method of wire-bonding an electrode formed in a core and an end portion of an electrical wiring to each other, for use in a magnetic head having a flexure having said electrical wiring formed therein, a fine adjustment actuator fixed to said flexure, and said core fixed to said fine adjustment actuator to be driven for said flexure by said fine adjustment actuator, said method comprising the steps of:

fixing the rear face of the formation part of the end portion of said electrical wiring in said flexure and the vicinity thereof by a first support surface of a wire-bonding apparatus;

clamping said core by a second support surface of said wire-bonding apparatus which is different from said first support surface, and a work clamp pin of said wire-bonding apparatus;

fixing said flexure, said fine adjustment actuator, and said core integrally with one another;

bonding the wire end portion to one of said electrode formed in said core and the end portion of said electrical wiring on said flexure; and rotating said flexure, said find adjustment actuator and said core integrally with one another by about 90 degrees to bond said wire to the other of said electrode formed in said core and the end portion of said electrical wiring on said flexure, wherein the fine adjustment actuator is not subjected to any clamping forces of the work clamp pin throughout said fixing.

2. The method according to claim 1, wherein said core includes a projection portion which is projected outwardly from said fine adjustment actuator when viewed from said flexure to face said flexure, a hole which is penetrated through said flexure to the rear face in the position roughly facing said projection portion is formed in said flexure, and said second support surface is provided through said hole portion to support said core.

3. The method according to claim 1, wherein said wire through which said core and the end portion of said electrical wiring are electrically connected to each other is connected in the state of being bent.

4. The method according to claim 1, wherein the bonding of said wire to said core and the end portion of said electrical wiring is carried out by using the ultrasonic wave.

5. A method of wire-bonding an electrode formed in a core and an end portion of an electrical wiring to each other, for use in a magnetic head having a flexure having said electrical wiring formed therein, a fine adjustment actuator fixed to said flexure, and said core fixed to said fine adjustment actuator to be driven for said flexure by said fine adjustment actuator, said method comprising the steps of:

fixing the rear face of the formation part of the end portion of said electrical wiring in said flexure and the vicinity thereof by a first support surface of a wire-bonding apparatus;

clamping said core by a second support surface of said wire-bonding apparatus which is different from said first support surface, and a work clamp pin of said wire-bonding apparatus;

fixing said flexure, said fine adjustment actuator, and said core integrally with one another;

bonding the wire end portion to one of said electrode formed in said core and the end portion of said electrical wiring on said flexure;

rotating said flexure, said find adjustment actuator and said core integrally with one another by about 90 degrees to bond said wire to the other of said electrode formed in said core and the end portion of said electrical wiring on said flexure, wherein the second support surface extends through an opening of the flexure.

6. The method according to claim 1, wherein the first support surface contacts the flexure and the second support surface clamps the core together with the work clamp pin.

* * * * *